United States Patent [19]
Ghaleb et al.

[11] Patent Number: 5,315,304
[45] Date of Patent: May 24, 1994

[54] DIGITAL MONOPULSE

[75] Inventors: Sam Ghaleb; Michael Stokes, both of Ridgecrest, Calif.

[73] Assignee: The United States of America as represented by the Secretary of the Navy, Washington, D.C.

[21] Appl. No.: 86,424

[22] Filed: Jul. 2, 1993

[51] Int. Cl.$^5$ .................................................. G01S 7/40
[52] U.S. Cl. ....................................... 342/165; 342/174; 342/151
[58] Field of Search ............... 342/165, 173, 174, 151, 342/152

[56] References Cited

U.S. PATENT DOCUMENTS

| | | | |
|---|---|---|---|
| 3,794,998 | 2/1974 | Pearson, Jr. et al. | 342/151 |
| 3,921,173 | 11/1975 | Thomson | 342/174 |
| 4,646,093 | 2/1987 | Postema et al. | 342/151 |
| 4,994,810 | 2/1991 | Sinsky | 342/151 |
| 5,070,336 | 12/1991 | Pringle | 342/151 |
| 5,241,316 | 8/1993 | Pringle | 342/62 |

Primary Examiner—Mark Hellner
Attorney, Agent, or Firm—Harvey Gilbert; Melvin Sliwka; John Forrest

[57] ABSTRACT

A digitally formed monopulse radar employing dynamic real-time calibration during operation. The invention has a transmitter section, timing circuit, RF section, IF section, in-phase and quadrature section and a digital signal processor. A portion of the transmit signal is diverted from the transmitter section for preparation of calibration factors during the calibration period between receive signals. The calibration factors prepared by the digital signal processor are applied by the processor to antenna received signals during the receive mode and to produce the corrected sum and delta pitch, and delta yaw signals and the tracking errors $\epsilon_y$ and $\epsilon_p$.

4 Claims, 4 Drawing Sheets

FIGURE I

DIGITAL MONOPULSE

FIELD OF THE INVENTION

The present invention relates to radar and more particularly to monopulse radar devices. More, specifically, the present invention relates to a digitally formed monopulse radar system.

BACKGROUND OF THE INVENTION

In current Radar tracking systems monopulse is used as the primary tracking technique. Conventional phase monopulse tracking (phase monopulse) utilizes a single antenna with four phase centers or a set of four separate antennas. The output of the four phase centers (1, 2, 3, and 4) (see FIG. 1) are fed into an RF circuit to form three channels of information (Sum, Yaw Delta, and Pitch Delta). The Sum channel is formed from 1+2+3+4. The Yaw Delta is formed from (1+3)−(2+4). The Pitch Delta is formed from (1+2)−(3+4). The sum channel is sent through a 90° phase shifter, then all three channels are sent through an AGC with the sum channel used as the normalizing signal. Then the normalized sum is correlated with each of the deltas to form epsilon pitch and epsilon yaw.

The major problem associated with this method is the matching of the three channels. This is done at the time of building of the system with no calibration possible after the system is assembled. The monopulse network used to form the sum and deltas is an added complexity to the system. It also introduces errors and is an added weight to the system.

SUMMARY OF THE INVENTION

It is thus an object of the present invention to provide a digitally formed monopulse radar.

It is yet another object of the present invention to provide a digitally formed monopulse employing dynamic real-time calibration during use.

It is still another object of the present invention to eliminate the monopulse network in a monopulse radar.

It is further an object of the present invention to eliminate the complexity, potential errors, and weight of the monopulse network in the conventional analog monopulse radar.

The digitally formed monopulse of the present invention may suitably comprise, consist of, or consist essentially of a transmitter section, a timing circuit, an RF section, an IF section, an in-phase and quadrature section, and a digital signal processor. The system takes the signals from the transmitter section for preparation of calibration factors during each calibration cycle and from each of the four antenna quadrants during a receive cycle through four parallel processing channels each including a low-noise amplifier RF section, an IF mixer IF section to heterodyne the RF to IF, followed by an in-phase and quadrature (IQ) section where each signal channel from the IF section is caused to produce an in-phase and quadrature signal which are then digitized by A/D converters in each channel and then fed to a digital signal processor.

The transmitter section of the invention provides a signal to the other elements of the invention in the calibration mode or cycle between receive signals to permit the digital signal processor to develop calibration factors to be applied by the digital signal processor to the antenna-received signals during the receive mode or cycle. The invention thus provides real-time derived corrections to antenna received signals and produces from the corrected sum and delta pitch and delta yaw signals the tracking errors $\epsilon_y$ and $\epsilon_p$.

These and other objects as well as the benefits and advantages provided by the present invention in addressing these objects will be more clearly understood upon consideration of the detailed description which follows in conjunction with the accompanying drawings.

DETAILED DESCRIPTION

Figure 1:
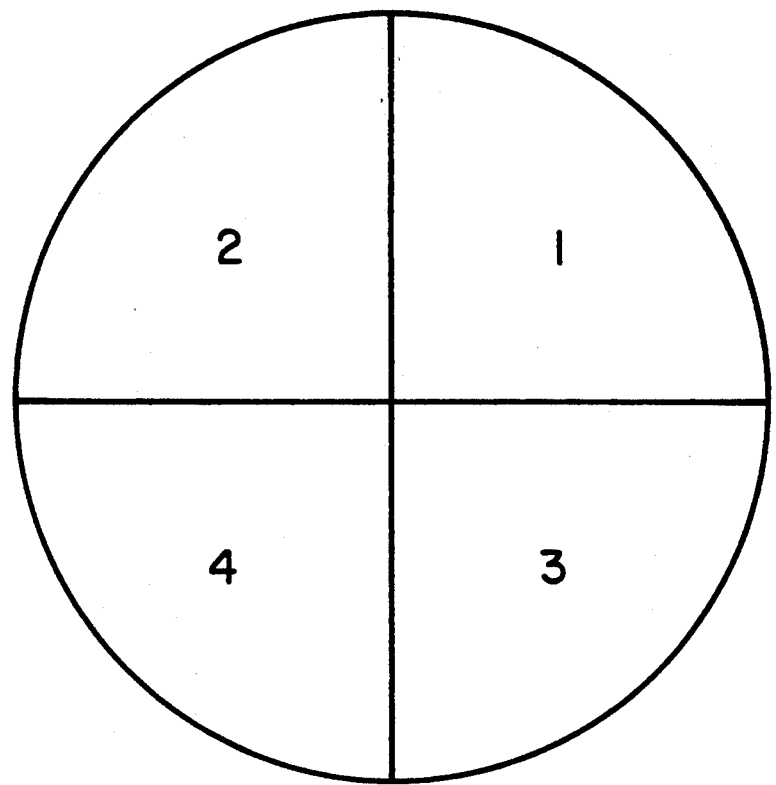
FIG. 1 is a pictorial representation of the four quadrants of a typical monopulse radar.
Figure 2:
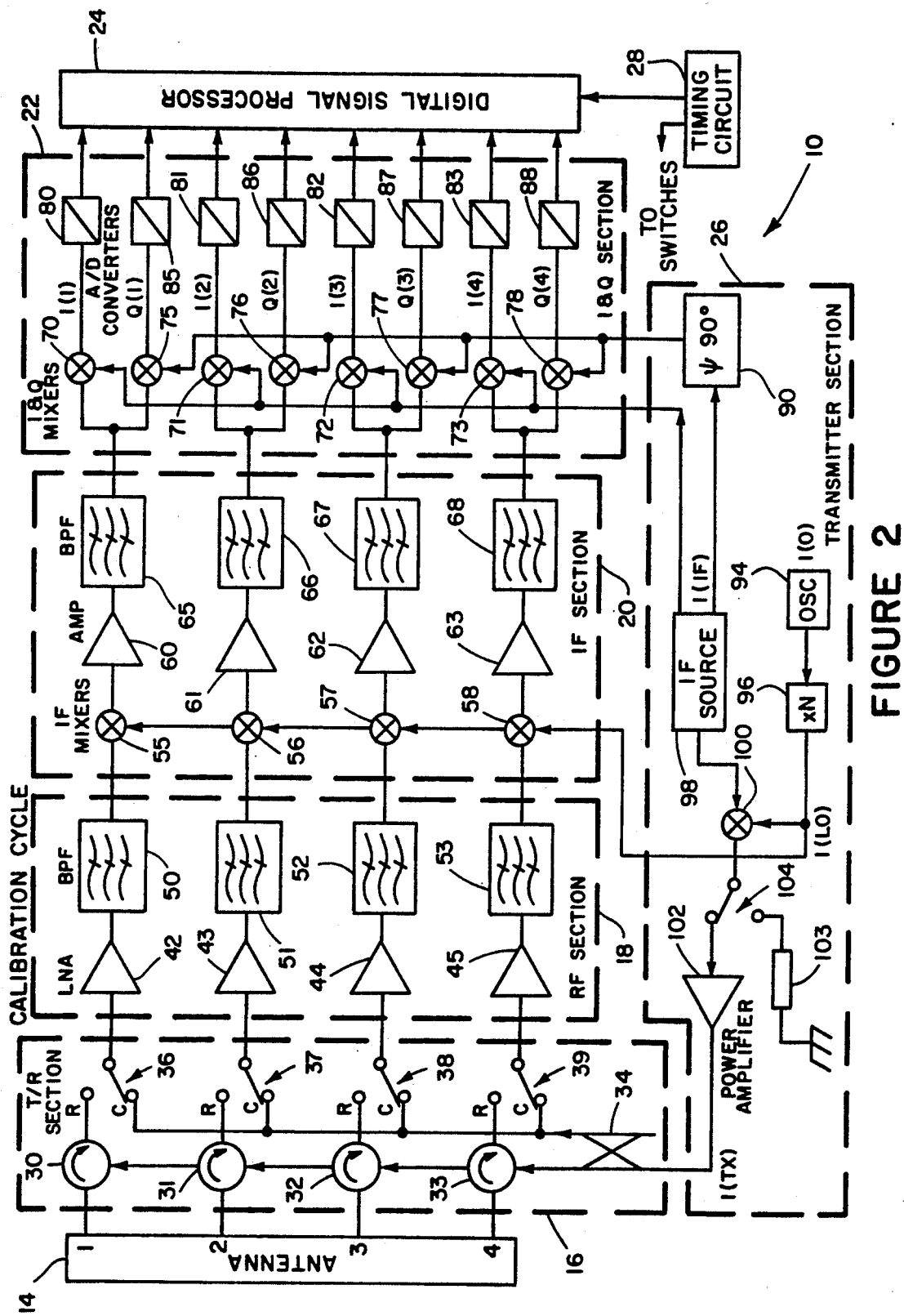
FIG. 2 is a functional schematic block diagram of the present invention configured for calibration operation.
Figure 3:
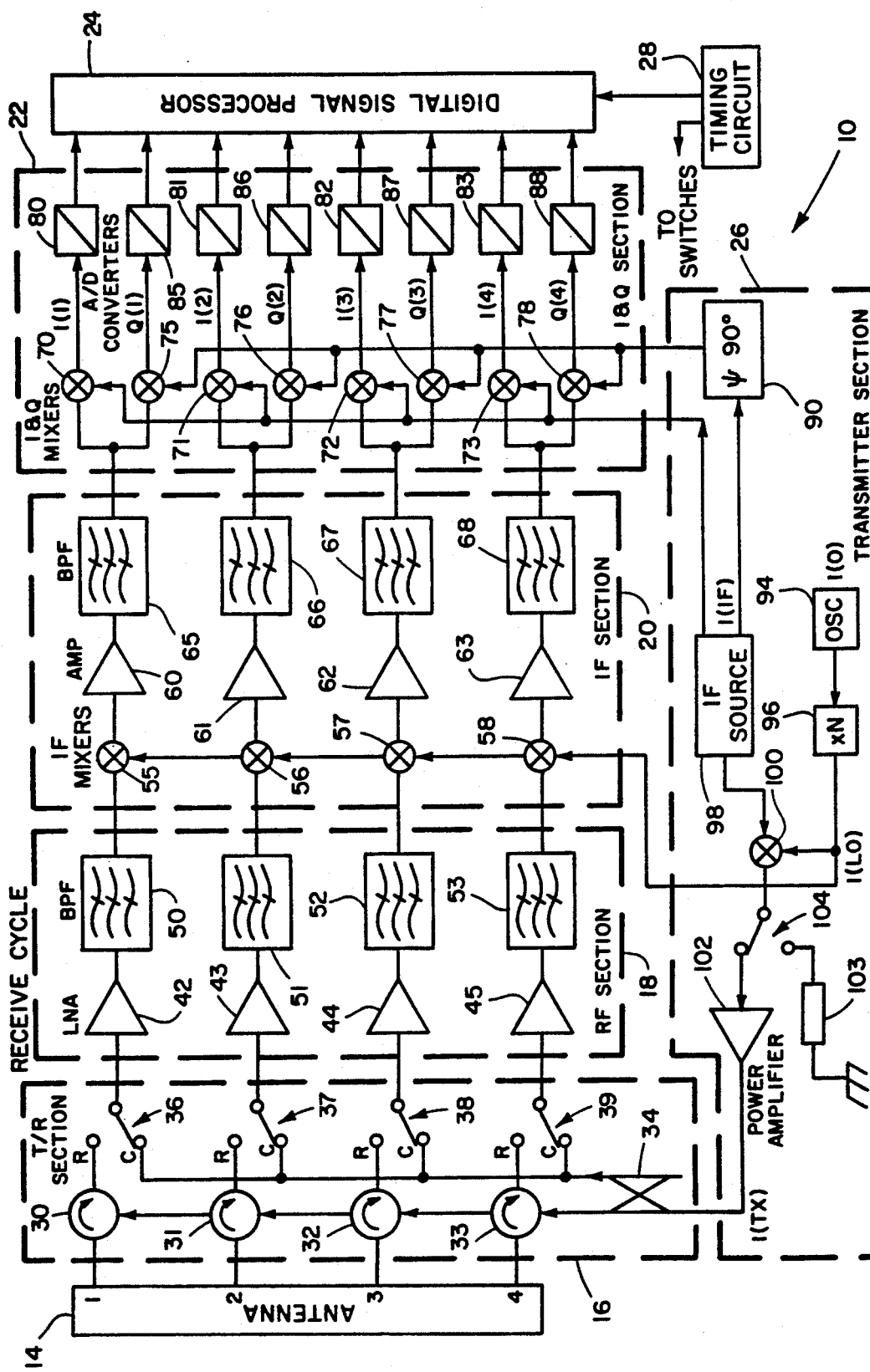
FIG. 3 is a functional schematic block diagram of the present invention configured for receive operation.

The digitally formed monopulse system 10 is shown schematically in FIGS. 2 and 3 configured for the calibration and receive cycles respectively.

The digitally formed monopulse system 10 is comprised of the antenna 14 which couples its transmit or receive signals to the transmit/receive section 16, the RF section 18 which connects either received signals from the antenna 14 or calibration signals from the transmitter section 26 after appropriate processing to the IF mixer section 20 where heterodyning the RF signals to IF signals is performed and which then connects to the in-phase and quadrature section 22 which produces in-phase and quadrature signals for each of the four IF signals received and converts the eight resultant signals to digital format for input to the digital signal processor 24. The timing circuit 28 provides synchronizing timing signals to the switches in the transmitter section 26 and the transmit/receive section 16, and to the digital signal processor 24. The transmitter section 26 provides a high power RF signal to the transmit/receive section 16, a local oscillator signal to the IF section 20, and an IF reference signal and a 90° phase-shifted reference signal to the in-phase and quadrature section 22.

More specifically the four quadrants of the antenna 14 are individually fed in parallel to their respective circulators 30, 31, 32, and 33 in the transmit/receive (T/R) section 16. Each of the circulators 30–33 in turn connect in parallel to RF switches 36–39, respectively. The RF switches 36–39 in the T/R section receive timing signals from timing circuit 28. The outputs of RF switches 36–39 connect in parallel to the low noise amplifiers 42–45 in the RF section 18. Each low noise amplifier 42–45 connects to its respective bandpass filter 50–53 within the RF section 18. The outputs of the bandpass filters 50–53 connect to their respective IF mixers 55–58 in the IF section 20. Within the IF section 20 each of the mixers receives an input from the local oscillator 94 via the frequency multiplier 96 output from the transmitter section 26. The IF output of each of the mixers 55–58 connects in series to its respective amplifier 60–63 which in turn connects in series with its respective bandpass filter 65–68. The outputs of the IF section 20 feed in parallel from each of the band pass filters 65–68 the in-phase and quadrature mixers 70–73 and 75–78, respectively, in parallel in I & Q section 22.

Each of the in-phase mixers 70-73 is connected to receive the IF input from the IF source 98 and each of the quadrature mixers 75-78 is connected to receive the IF signal from IF source 98 phase shifted 90° by phase shifter 90. Within the I & Q section 22 the output of each in-phase mixer 70-73 connects to its respective analog to digital converter 80-83, and each quadrature mixer 75-78 connects to its respective analog to digital converter 85-88. The outputs from the I & Q section 22 connect in parallel from each of the analog to digital converters 80-83 and 85-88 to the digital signal processor 24.

It should be noted that the local oscillator 94 provides its output via frequency multiplier 96 to mixer 100 which also receives the IF output from IF source 98. The output of the mixer 100 connects via switch 104 to power amplifier 102 to output from the transmitter section 26 during each calibration period and then to directional coupler 34 in the T/R section which simultaneously feeds the circulators 30-33 and the RF switches 36-39 during each calibration period of the system 10. During each receive period switch 104 disconnects from power amplifier 102 and connects to load 103 which is in turn connected to ground in the transmitter section 26.

OPERATION

During the calibration cycle, the transmitter section 26 sends a high power RF signal to the Transmit/Receive (T/R) section 16. In the Transmit/Receive (T/R) section 16 the signal is sent through a directional coupler (34) producing two signals of different power levels. The high power signal is sent to the four circulators 30, 31, 32, and 33 and transmitted by the antenna (14). The lower power signal is sent to the four high speed Radio Frequency (RF) switches 36, 37, 38 and 39. During the calibration cycle these switches are closed on the directional coupler leg. The signals are then sent to the Radio Frequency (RF) section 18 where they are amplified by four Low Noise Amplifiers (LNA) 42, 43, 44, and 45 and then filtered by four Band Pass Filters (BPF) 50, 51, 52, and 53 to reduce noise. The signals then enter the Intermediate Frequency (IF) Section 20 where they are fed into IF mixers 55, 56, 57, and 58 to be mixed with the Local Oscillator 94 Frequency (f(LO)) for heterodyning to produce the Intermediate Frequency (IF) signals. These signals are amplified in amplifiers 60, 61, 62, and 63 and filtered in bandpass filters 65, 66, 67, and 68 and sent to the In-phase and Quadrature (I&Q) Section 22. Here each signal is split in two and sent to the In-phase and Quadrature (I&Q) mixers 70, 71, 72, and 73, and 75, 76, 77, and 78 respectively. The In-phase (I) mixers 70, 71, 72, and 73 are fed with the Intermediate Frequency (IF) calibration signal and the IF reference signal from IF source 98, and produce the four baseband In-phase (I) signals. The Quadrature (Q) mixers 75, 76, 77 and 78 are fed with the Intermediate Frequency (IF) reference signal shifted 90° in phase by the phase shifter 90 producing the four baseband Quadrature (Q) signals. The baseband In-phase (I) and Quadrature (Q) signals are then sampled by eight Analog to Digital (A/D) Converters 80-88 to provide a digital amplitude and phase of each signal to the Digital Signal Processor 24.

The Digital Signal Processor 24 uses the I and Q signals to calculate calibration factors for the system during the calibration cycle of system operation. These calibration factors correct for phase mismatches, amplitude mismatches, and low noise amplifier (LNA) 42-45 drift within the system. This can be done in either of two ways.

The first method uses the In-phase and Quadrature (I&Q) signals from the first channel 110 and 112 respectivley, as a standard and corrects the other three channels to that standard. This is done by forming calibration factors. These factors are the ratio of the standard channel In-phase and Quadrature signals (I(1) and Q(1)) divided by each of the other channel signals (I(2), Q(2), I(3), Q(3), I(4), Q(4)) to form the six calibration factors K(I2), K(Q2), K(I3), K(Q3), K(I4), K(Q4). The equation for each of these calibration factors is as follows:

$$K(I2) = I(1)/I(2)$$

$$K(Q2) = Q(1)/Q(2)$$

$$K(I3) = I(1)/I(3)$$

$$K(Q3) = Q(1)/Q(3)$$

$$K(I4) = I(1)/I(4)$$

$$K(Q4) = Q(1)/Q(4)$$

Figure 4:
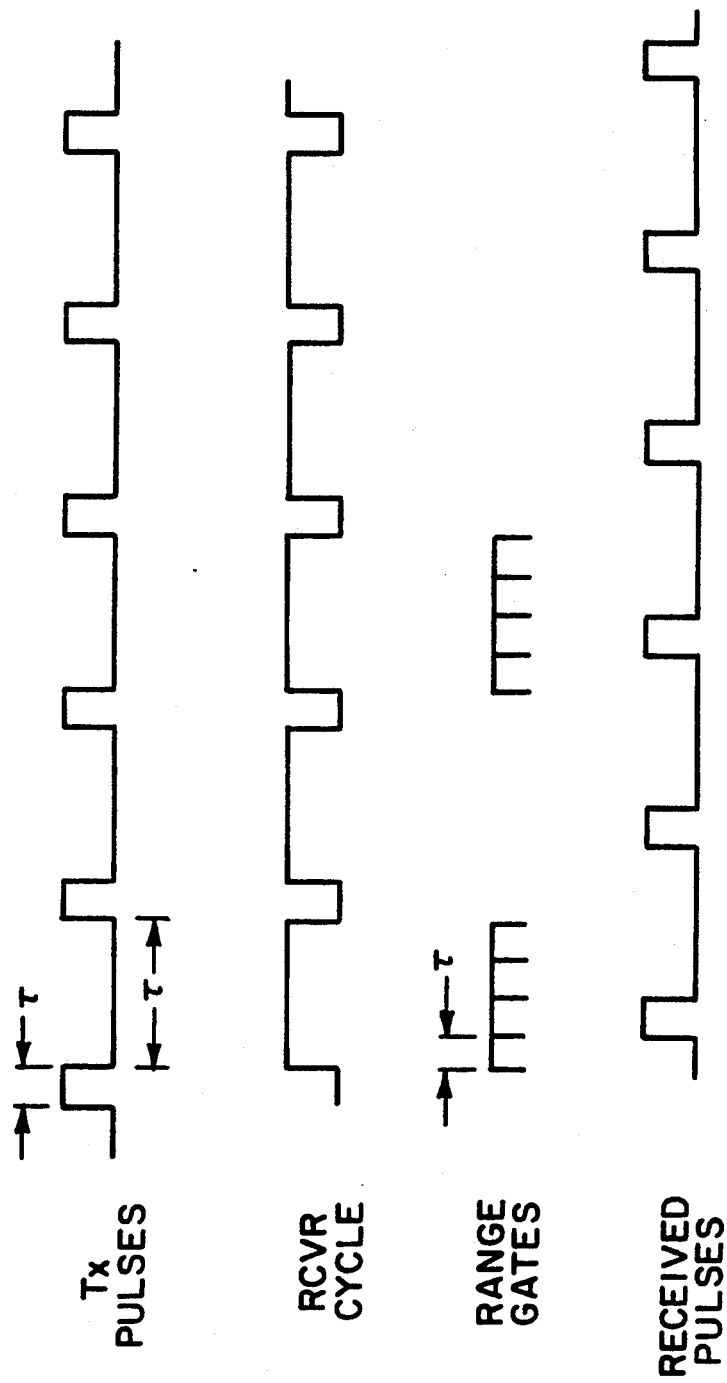
FIG. 4 is a timeline showing calibration time period versus receive time period.

These equations are then used during the receive period to correct for system errors. FIG. 4 shows the calibration functions are to be completed during the time between the transmission of the transmitted pulse and the time the received pulse arrives and before the next transmission of a transmitted pulse.

During the receive cycle the transmitter section 26 is switched out by switch 104 and the four high speed Radio Frequency (RF) switches 36-39 are switched to the circulator leg. The signal received by the antenna 14 passes through the four circulators 30-33 and Radio Frequency (RF) switches 36-39 into the Radio Frequency (RF) section 18 where they are amplified by the four Low Noise Amplifiers (LNA) 42-45 and filtered by the four Band Pass Filters (BPF) 50-53 to reduce noise. The signals then enter the Intermediate Frequency (IF) Section 20 where they are fed into mixers 55-58 to be mixed with the Local Oscillator 94 Frequency (f(LO)) for heterodyning to produce the Intermediate Frequency (IF) signals. These signals are amplified by amplifiers 60-63 and filtered by bandpass filters 65-68 and sent to the In-phase and Quadrature (I&Q) Section 22. Here each signal is split in two and sent to the In-phase and Quadrature (I&Q) mixers 70-73 and 75-78 respectively. The In-phase (I) mixers 70-73 are fed with the Intermediate Frequency (IF) signal and produce the four baseband In-phase (I) signals. The Quadrature (Q) mixers 75-78 are fed with the Intermediate Frequency (IF) signal shifted 90° in phase by phase shifter 90 producing the four baseband Qaudrature (Q) signals. The baseband In-phase and Quadrature signals are then sampled by eight Analog to Digital (A/D) Converters 80-83 and 85-88, respectively, to provide a digital equivalent of each signal to the Digital Signal Processor 24. The correction factors from the preceding calibration period are then used to calculate the corrected signals. This is done by multiplying the received signal by the correction factor. The equations for each are as follows:

$$I'(1) = I(1)$$

$$Q'(1) = Q(1)$$

$I'(2) = I(2) \times K(I2)$ $Q'(2) = Q(2) \times K(Q2)$ $I'(3) = I(3) \times K(I3)$ $Q'(3) = Q(3) \times K(Q3)$ $I'(4) = I(4) \times K(I4)$ $Q'(4) = Q(4) \times K(Q4)$ Where the prime indicates the corrected value. The digital signal processor 24 may be implemented by hardware, software, and firmware means commonly known to those working in the digital electronic arts.

These corrected values are then used in the digital signal processor 24 to calculate the Sum and Difference Signals which are used to form the boresight error signals ($\epsilon_y, \epsilon_p$) for both yaw and pitch for each receive signal period following each calibration period.

The Sum ($\Sigma$) is calculated by adding the four signals, (i.e., $\Sigma = 1+2+3+4$ where 1,2,3,4 are the complex I&Q values for each channel). The Delta Pitch ($\Delta_p$), Delta Yaw ($\Delta_y$), and Delta Diagonal ($\Delta_d$) are calculated in the following manner:

$\Delta_p = (1+2) - (3+4)$ $\Delta_y = (1+3) - (2+4)$ $\Delta_d = (1+4) - (2+3)$ The second calibration method used is performed in the digital signal processor 24 at the Sum and Delta level. The signals are sent through the system as described above. The signals in the four channels are:

$(1) = a_1 e^{j\delta 1}$ $(2) = a_2 e^{j\delta 2}$ $(3) = a_3 e^{j\delta 3}$ $(4) = a_4 e^{j\delta 4}$ where $a_i$ and $\delta_i$ are amplitude and phase of the calibration signal which contains the amplitude and phase mismatches.

These signals are used to form the sum and delta error values during the calibration period, as follows:

$\Sigma_e = (1)+(2)+(3)+(4) = a_1 e^{j\delta 1} + a_2 e^{j\delta 2} + a_3 e^{j\delta 3} + a_4 e^{j\delta 4}$ $Mag(\Sigma_e) = ((I\Sigma^2) + (Q\Sigma^2))^{\frac{1}{2}}$ phase $\Sigma_e = \tan^{-1}(Q\Sigma/I\Sigma)$ where $I\Sigma = I_1 + I_2 + I_3 + I_4$ and
$Q\Sigma = Q_1 + Q_2 + Q_3 + Q_4$ Similarly $\Delta_{pe} = ((1)+(2)) - ((3)+(4))$ $Mag(\Delta_{pe}) = [\{(I_1+I_2)-(I_3+I_4)\}^2 + \{(Q_1+Q_2)-(Q_3+Q_4)\}^2]^{\frac{1}{2}}$ phase$\Delta_{pe} = \tan^{-1}$
$[\{(Q_1+Q_2)-(Q_3+Q_4)\}/\{(I_1+I_2)-(I_3+I_4)\}]$ and $\Delta_{ye} = ((1)+(3)) - ((2)+(4))$ $Mag(\Delta_{ye}) = [\{(I_1+I_3)-(I_2+I_4)\}^2 + \{(Q_1+Q_3)-(Q_2+Q_4)\}^2]^{\frac{1}{2}}$ phase$\Delta_{ye} = \tan^{-1}$
$[\{(Q_1+Q_3)-(Q_2+Q_4)\}/\{(I_1+I_3)-(I_2+I_4)\}]$ and $\Delta_{de} = ((1)+(4)) - ((2)+(3))$ $Mag(\Delta_{de}) = [\{(I_1+I_4)-(I_2+I_3)\}^2 + \{(Q_1+Q_4)-(Q_2+Q_3)\}^2]^{\frac{1}{2}}$ phase$\Delta_{de} = \tan^{-1}$
$[\{(Q_1+Q_4)-(Q_2+Q_3)\}/\{(I_1+I_4)-(I_2+I_3)\}]$ These values are stored in the Digital Signal Processor 24 and used as correction factors for calculating the Sum ($\Sigma$) and the Deltas ($\Delta_y, \Delta_p, \Delta_{de}$) from the signals obtained during the receive cycle.

From the Sum ($\Sigma$) and the Deltas ($\Delta_y, \Delta_p$) the tracking errors ($\epsilon_y, \epsilon_p$) are calculated. This is done by taking the negative of the imaginary part of the quotient Delta divided by the Sum ($\Sigma$), (i.e., $\epsilon_y = -\text{Im}(\Delta_y/\Sigma)$ and $\epsilon_p = -\text{Im}(\Delta_p/\Sigma)$ or by taking the Sum shifted by 90° in-phase and multiplying (dot product) by the Delta (assumes a 90° phase shift between the Sum and Delta) and dividing by the magnitude of the sum squared, i.e. ($\epsilon_y = \Sigma_{90}$ dot $\Delta_y/(Mag(\Sigma))^2$ and $\epsilon_p = \Sigma_{90}$ dot $\Delta_p/(Mag(\Sigma))^2$).

The structures and methods disclosed herein illustrate the principles of the present invention. The invention may be embodied in other specific forms without departing from its spirit or essential characteristics. The embodiments of the invention described herein are to be considered in all respects as exemplary and illustrative rather than restrictive. Therefore, the appended claims rather than the foregoing desciption define the scope of the invention. All modifications to the embodiments described herein that come within the meaning and range of equivalence of the claims are embraced within the scope of the invention.

What is now claimed is:

1. A digitally formed monopulse system having a transmission/calibration cycle and a receive cycle, said system comprising:

means for signal transmission to and return signal reception from an environment external to said system;

means for producing signals for external transmission and internal signal processing, said producing means connected to said means for signal transmission and reception, and to said means for internal signal processing;

means for diverting a portion of said signal produced for external transmission to said means for internal signal processing during said transmission/calibration cycle; and means for internal signal processing comprising four signal processing channels for simultaneous processing of four-quadrant antenna transmit and receive signal information connected to said means for transmission and reception, said signal processing channels for calculating calibration factors reflecting system characteristics during the transmission/calibration cycle of said system, for calculating corrected signals received during the immediately following receive cycle, and for calculating the monopulse information derived therefrom and wherein each of said channels provides in-phase and quadrature signals to a digital signal processor for production of calibration factors, where said in-phase and quadrature signals in one channel are used as the standard for correcting the other three channels to that standard in accordance with the following equations:

$$K(I2) = I(1)/I(2)$$

$$K(Q2) = Q(1)/Q(2)$$

$$K(I3) = I(1)/I(3)$$

$$K(Q3) = Q(1)/Q(3)$$

$$K(I4) = I(1)/I(4)$$

$$K(Q4) = Q(1)/Q(4)$$

where K(I2), K(Q2), K(I3), K(Q3), K(I4), K(Q4) are the calibration factors calculated as the ratio of the standard channel I(1) and Q(1) divided by each of the other channels I(2), Q(2), I(3), Q(3), I(4), and Q(4), and where during said receive cycle said means for digital signal processing uses the correction factors calculated during the calibration cycle to calculate the corrected signals received in accordance with the following equations:

$$I'(1) = I(1)$$

$$Q'(1) = Q(1)$$

$$I'(2) = I(2) \times K(I2)$$

$$Q'(2) = Q(2) \times K(Q2)$$

$$I'(3) = I(3) \times K(I3)$$

$$Q'(3) = Q(3) \times K(Q3)$$

$$I'(4) = I(4) \times K(I4)$$

$$Q'(4) = Q(4) \times K(Q4)$$

where the primes are the corrected values then used by said digital signal processing means to calculate the sum ($\Sigma$)

$$\Sigma = 1 + 2 + 3 + 4$$

where 1, 2, 3, and 4 are the complex I and Q values for each channel, and where said digital signal processing means calculates
the delta pitch ($\Delta p$)

$$\Delta p = (1+2) - (3+4) \text{ and}$$

the delta yaw ($\Delta y$)

$$\Delta y = (1+3) - (2+4); \text{ and}$$

the delta diagonal ($\Delta d$)

$$\Delta d = (1+4) - (2+3).$$

2. A digitally formed monpulse system having a calibration cycle and a receive cycle, and having four signal processing channels for simultaneous processing of four-quadrant antenna transmit and receive information, said system comprising:

means for producing a high power RF signal, an IF reference signal, a 90° phase-shifted IF signal, and a local oscillator signal;

means connected to said producing means for transmitting a high power portion of said RF signal to said antenna and a low power portion of said RF signal as an output during said calibration cycle, and receiving an RF return signal from said antenna as an output during said receive cycle;

means connected to said transmitting and receiving means for amplifying and bandpass filtering the RF signal coupled from said transmitting and receiving means;

means for heterodyning the RF signal from said amplifying and filtering means with the local oscillator signal from said producing means and filtering the resultant IF signal to eliminate the sidebands;

means for creating four baseband digital in-phase signals and four baseband digital quadrature signals from said IF signal from said heterodyning and filtering means and the IF reference signal and the 90° phase-shifted IF signal from said producing means, said creating means providing said digital in-phase and quadrature signals as an output;

means for digital signal processing, said means calculating and storing calibration factors for the system during said calibration cycle for use in correcting signals received from said antenna for phase mismatches, amplitude mismatches, and low noise amplifier drift within the system during said receive cycle, said calibration factors calculated using the digital in-phase signals from one of said channels as the standard and correcting the other three channels to that standard in accordance with the following equations:

$$K(I2) = I(1)/I(2)$$

$$K(Q2) = Q(1)/Q(2)$$

$$K(I3) = I(1)/I(3)$$

$$K(Q3) = Q(1)/Q(3)$$

$$K(I4) = I(1)/I(4)$$

$$K(Q4) = Q(1)/Q(4)$$

where K(I2), K(Q2), K(I3), K(Q3), K(I4), K(Q4) are the calibration factors calculated as the ratio of the standard channel I(1) and Q(1) divided by each of the other channels I(2), Q(2), I(3), Q(3), I(4), and Q(4), and where during said receive cycle said means for digital signal processing uses the correction factors calculated during the calibration cycle to calculate the corrected signals received in accordance with $$I'(1) = I(1)$$

$$Q'(1) = Q(1)$$

$$I'(2) = I(2) \times K(I2)$$

$$Q'(2) = Q(2) \times K(Q2)$$

$$I'(3) = I(3) \times K(I3)$$

$$Q'(3) = Q(3) \times K(Q3)$$

$$I'(4) = I(4) \times K(I4)$$

$$Q'(4) = Q(4) \times K(Q4)$$

where the primes are the corrected values then used by said digital signal processing means to calculate the sum ($\Sigma$)

$$\Sigma = 1 + 2 + 3 + 4$$

where 1, 2, 3, and 4 are the complex I and Q values for each channel, and where said digital signal processing means calculates
the delta pitch ($\Delta p$)

$$\Delta p = (1+2) - (3+4) \text{ and}$$

the delta yaw ($\Delta y$)

$$\Delta y = (1+3) - (2+4); \text{ and}$$

the delta diagonal ($\Delta d$)

$$\Delta d = (1+4) - (2+3).$$

means for producing and providing timing signals to said transmitting and receiving means and to said digital signal processing means.

3. A digitally formed monpulse system having a calibration cycle and a receive cycle, and having four signal processing channels for simultaneous processing of four-quadrant antenna transmit and receive information, said system comprising:
  means for producing a high power RF signal, an IF reference signal, a 90° phase-shifted IF signal, and a local oscillator signal;
  means connected to said producing means for transmitting a high power portion of said RF signal to said antenna and a low power portion of said RF signal as an output during said calibration cycle,
  means connected to said transmitting and receiving means for amplifying and bandpass filtering the RF signal coupled from said transmitting and receiving means;
  means for heterodyning the RF signal from said amplifying and filtering means with the local oscillator signal from said producing means and filtering the resultant IF signal to eliminate the sidebands;
  means for creating four baseband digital in-phase signals and four baseband digital quadrature signals from said IF signal from said heterodyning and filtering means and the IF reference signal and the 90° phase-shifted IF signal from said producing means, said creating means providing said digital in-phase and quadrature signals as an output;
  means for digital signal processing, said means calculating and storing calibration factors for the system during said calibration cycle for use in correcting signals received from said antenna for phase mismatches and low noise amplifier drift within system during said calibration cycle for use in correcting signals received from said antenna for phase mismatches and low noise amplifier drift within the system during said receive cycle, said calibration factors calculated using the signals in the four channels $$(1) = \alpha_1 e^{j\delta_1}$$

$$(2) = \alpha_2 e^{j\delta_2}$$

$$(3) = \alpha_3 e^{j\delta_3}$$

$$(4) = \alpha_4 e^{j\delta_4}$$

where $\alpha_i$ and $\delta_i$ for $i = 1$ to 4 are amplitude and phase, respectively, of the calibration signal which contains the amplitude and phase mismatches and drift effects and are used to calculate the Sum ($\Sigma$) and delta ($\Delta$) error values during the calibration cycle as:

$$\Sigma_e = (1) + (2) + (3) + (4) = \alpha_1 e^{j\delta_1} + \alpha_2 e^{j\delta_2} + \alpha_3 e^{j\delta_3} + \alpha_4 e^{j\delta_4}$$

and

Magnitude of $\Sigma_e = ((I_\Sigma^2) + (Q_\Sigma^2))^{\frac{1}{2}}$ where I is the in-phase and Q is the quadrature component of the calibration signal
and $$\text{Phase of } \Sigma_e = \tan^{-1}\left(\frac{Q_\epsilon}{I_\epsilon}\right) \text{ and}$$

where $$I_\Sigma = I_1 + I_2 + I_3 + I_4 \text{ and } Q_\Sigma = Q_1 + Q_2 + Q_3 + Q_4$$

and $$\Delta_{pe} = ((1) + (2)) - ((3) + (4))$$

and

Magnitude of
$$\Delta_{pe} = [\{(I_1 + I_2) - (I_3 + I_4)\}^2 + \{(Q_1 + Q_2) - (Q_3 + Q_4)\}^2]^{\frac{1}{2}}$$

and $$\text{Phase of } \Delta_{pe} = \tan^{-1}\left[\frac{(Q_1 + Q_2) - (Q_3 + Q_4)}{(I_1 + I_2) - (I_3 + I_4)}\right]$$

and $$\Delta_{ye} = ((1) + (3)) - ((2) + (4))$$

Magnitude of
$$\Delta_{ye} = [\{(I_1 + I_3) - (I_2 + I_4)\}^2 + \{(Q_1 + Q_3) - (Q_2 + Q_4)\}^2]^{\frac{1}{2}}$$

and $$\text{Phase of } \Delta_{ye} = \tan^{-1}\left[\frac{(Q_1 + Q_3) - (Q_2 + Q_4)}{(I_1 + I_3) - (I_2 + I_4)}\right]$$

$$\Delta_{de} = ((1) + (4)) - ((2) + (3))$$

Magnitude of
$$\Delta_{de} = [\{(I_1 + I_4) - (I_2 + I_3)\}^2 + \{(Q_1 + Q_4) - (Q_2 + Q_3)\}^2]^{\frac{1}{2}}$$

and $$\text{Phase of } \Delta_{de} = \tan^{-1}\left[\frac{(Q_1 + Q_4) - (Q_2 + Q_3)}{(I_1 + I_4) - (I_2 + I_3)}\right]$$

from which correction factors the tracking errors $\epsilon_y$ and $\epsilon_p$ are calculated during the receive cycle as the negative of the imaginary part of the quotient Delta divided by Sum $$\epsilon_y = -Im\left(\frac{\Delta_y}{\epsilon}\right) \text{ and}$$

$$\epsilon_p = -Im\left(\frac{\Delta_p}{\epsilon}\right), \text{ and}$$

means for producing and providing timing signals to said transmitting and receiving means and to said digital signal processing means.

4. A digitally formed monopulse system having a transmission/calibration cycle and a receive cycle, said system comprising:
   means for signal transmission to and return signal reception from an environment external to said system;
   means for producing signals for external transmission and internal signal processing, said producing means connected to said means for signal transmission and reception, and to said means for internal signal processing;
   means for diverting a portion of said signal produced for external transmission to said means for internal signal processing during said transmission/calibration cycle; and
   means for internal signal processing connected to said means for transmission and reception, said means for internal signal processing comprising four signal processing channels for simultaneous processing of four-quadrant antenna transmit and receive signal information, for calculating calibration factors reflecting system characteristics during the transmission/calibration cycle of said system, for calculating corrected signals received during the immediately following receive cycle, and for calculating the monopulse information derived therefrom; and
   wherein the tracking errors in said monopulse information are calculated by said digital signal processing means during the receive cycle as the Sum shifted by 90° in phase and multiplying (dot product) by the Delta (where there is a 90° phase shift between the Sum and Delta) and dividing the magnitude of the sum squared, such that $$\epsilon_y = \frac{\Sigma_{90} \cdot \Delta y}{(Mag(\Sigma))^2} \text{ and } \epsilon_p = \frac{\Sigma_{90} \cdot \Delta p}{(Mag(\Sigma))^2}.$$

* * * * *